(12) United States Patent
Morey

(10) Patent No.: US 6,729,567 B1
(45) Date of Patent: May 4, 2004

(54) SIDE FEED WHEEL ASSEMBLY FOR WOOD CHIPPER

(75) Inventor: Michael Dwain Morey, Mt. Pleasant, MI (US)

(73) Assignee: Tramor, Inc., Remus, MI (US)

( * ) Notice: Subject to any disclaimer, the term of this patent is extended or adjusted under 35 U.S.C. 154(b) by 0 days.

(21) Appl. No.: 10/152,550

(22) Filed: May 21, 2002

Related U.S. Application Data (60) Provisional application No. 60/308,883, filed on Jul. 31, 2001.

(51) Int. Cl.7 ................................................ B02C 18/22
(52) U.S. Cl. ....................................................... 241/92
(58) Field of Search ............................. 144/181; 241/92, 241/282, 280

(56) References Cited

U.S. PATENT DOCUMENTS

| | | | |
|---|---|---|---|
| 190,675 A | 5/1877 | Gaines | |
| 589,236 A | 8/1897 | Williams | |
| 604,283 A | 5/1898 | Albrecht | |
| 1,266,894 A | 5/1918 | Williams | |
| 1,713,507 A | 5/1929 | Ammon | |
| 1,752,290 A | 4/1930 | Ammon | |
| 1,889,129 A | 11/1932 | Nielsen | |
| 1,959,465 A | 5/1934 | Dryfoos | |
| 2,026,790 A | 1/1936 | Mankoff | |
| 2,128,194 A | 8/1938 | Sheldon | |
| 2,244,577 A | 6/1941 | Schreiber | |
| 2,318,219 A | 5/1943 | Harris | |
| 2,392,958 A | 1/1946 | Tice | |
| 2,658,318 A | 11/1953 | Miller | |
| 2,663,505 A | 12/1953 | Sennholtz | |
| 2,678,169 A | 5/1954 | Tullis | |
| 2,710,635 A | 6/1955 | Alexander | |
| 2,837,290 A | 6/1958 | Nagel | |
| 2,863,476 A | 12/1958 | Clark | |
| 2,864,420 A | 12/1958 | Schmidt | |
| 3,030,037 A | 4/1962 | Raetz | |
| 3,069,101 A | 12/1962 | Wexell | |
| 3,076,489 A | 2/1963 | Schmidt et al. | |
| 3,182,917 A | 5/1965 | Tamny et al. | |
| 3,254,687 A | 6/1966 | Tertyshnikov | |
| 3,276,700 A | 10/1966 | Eklund | |
| 3,367,585 A | 2/1968 | Ratkowski | |
| 3,436,028 A | 4/1969 | Koehnen et al. | |
| 3,463,405 A | 8/1969 | Shepherd | |
| 3,509,924 A | 5/1970 | Newhouse, Jr. | |
| 3,559,724 A | 2/1971 | Wilkinson | |
| 3,635,410 A | 1/1972 | Smith | |
| 3,642,214 A | 2/1972 | Blackwell, Jr. | |
| 3,844,494 A | 10/1974 | Hightower | |
| 3,868,062 A | 2/1975 | Cunningham et al. | |
| 3,907,016 A | 9/1975 | Nicholson et al. | |
| 3,907,216 A | 9/1975 | MacKissic et al. | |
| 3,936,004 A | 2/1976 | Graf et al. | |
| 3,939,886 A | 2/1976 | Tucek | |
| 3,977,447 A | * 8/1976 | Pease ......................... 144/172 |
| 3,989,198 A | 11/1976 | Blasko | |
| 4,022,021 A | 5/1977 | Russell, Jr. | |
| 4,074,594 A | 2/1978 | Dall et al. | |
| 4,077,450 A | 3/1978 | Ackerman | |

(List continued on next page.)

FOREIGN PATENT DOCUMENTS

| | | |
|---|---|---|
| DE | 36 24 996 A1 | 2/1988 |
| DE | 38 08 487 C1 | 5/1989 |

*Primary Examiner*—Mark Rosenbaum
(74) *Attorney, Agent, or Firm*—Bliss McGlynn, P.C.

(57) ABSTRACT

A side feed wheel assembly for a wood chipper includes at least one side feed wheel adapted to be disposed adjacent at least one primary feed wheel of the wood chipper. The side feed wheel assembly also includes a mechanism for moving the at least one side feed wheel transversely relative to the at least one primary feed wheel to feed wood material to the at least one primary feed wheel of the wood chipper.

21 Claims, 7 Drawing Sheets

U.S. PATENT DOCUMENTS

| | | |
|---|---|---|
| 4,117,985 A | 10/1978 | Lazareck |
| 4,129,260 A | 12/1978 | Baker |
| 4,146,184 A | 3/1979 | Whitney |
| 4,162,769 A | 7/1979 | Lapointe |
| 4,168,035 A | 9/1979 | Palm et al. |
| 4,260,114 A | 4/1981 | Herder |
| 4,452,400 A | 6/1984 | Williams |
| 4,504,019 A | 3/1985 | Newell et al. |
| 4,527,604 A | 7/1985 | Everett |
| 4,544,104 A | 10/1985 | Carlsson |
| 4,560,110 A | 12/1985 | Burda |
| 4,598,745 A | 7/1986 | Parviainen |
| 4,685,624 A | 8/1987 | Nidiffer et al. |
| 4,687,179 A | 8/1987 | Smith |
| 4,692,028 A | 9/1987 | Schave |
| 4,702,424 A | 10/1987 | Widlak |
| 4,716,823 A | 1/1988 | Capdevila |
| 4,717,083 A | 1/1988 | Quast et al. |
| 4,721,257 A | 1/1988 | Williams et al. |
| 4,793,561 A | 12/1988 | Burda |
| 4,796,819 A | 1/1989 | Waterman |
| 4,850,406 A | 7/1989 | Krautzberger |
| 4,872,500 A | 10/1989 | Duffey et al. |
| 4,906,486 A | 3/1990 | Young |
| 4,915,310 A | 4/1990 | Stelk |
| 4,917,314 A | 4/1990 | Manschwetus |
| 4,922,977 A | 5/1990 | Colton et al. |
| 4,967,969 A | 11/1990 | Griffith, III |
| 4,982,904 A | 1/1991 | Greiner |
| 5,005,620 A | 4/1991 | Morey |
| 5,018,672 A | 5/1991 | Peck et al. |
| 5,042,727 A | 8/1991 | Plante |
| 5,044,567 A | 9/1991 | Hausler et al. |
| 5,078,328 A | 1/1992 | Willingham |
| 5,088,532 A | 2/1992 | Eggers et al. |
| RE33,840 E | 3/1992 | Peterson et al. |
| 5,114,085 A | 5/1992 | Inui |
| 5,167,374 A | 12/1992 | Strohmeyer |
| 5,205,496 A | 4/1993 | O'Donnell et al. |
| 5,209,278 A | 5/1993 | Carpenter et al. |
| 5,263,651 A | 11/1993 | Nadarajah |
| 5,285,974 A | 2/1994 | Cesarini |
| 5,299,610 A * | 4/1994 | Sentagnes et al. .......... 144/370 |
| 5,358,189 A | 10/1994 | Vandermolen |
| 5,362,004 A | 11/1994 | Bateman |
| 5,372,316 A | 12/1994 | Bateman |
| 5,377,919 A | 1/1995 | Rogers et al. |
| 5,413,286 A | 5/1995 | Bateman |
| 5,474,239 A | 12/1995 | Williams, Jr. et al. |
| 5,526,988 A | 6/1996 | Rine |
| 5,667,152 A | 9/1997 | Mooring |
| 5,692,548 A | 12/1997 | Bouwers et al. |
| 5,988,539 A | 11/1999 | Morey |
| 6,000,642 A | 12/1999 | Morey |
| 6,016,855 A | 1/2000 | Morey |
| 6,032,707 A | 3/2000 | Morey et al. |
| 6,036,125 A | 3/2000 | Morey et al. |
| 6,293,479 B1 | 9/2001 | Kaczmarski et al. |

* cited by examiner

SIDE FEED WHEEL ASSEMBLY FOR WOOD CHIPPER

CROSS-REFERENCE TO RELATED APPLICATION(S)

The present invention claims the priority date of copending U.S. Provisional Patent Application Serial No. 60/308,883, filed Jul. 31, 2001.

BACKGROUND OF THE INVENTION

1. Field of the Invention

The present invention relates generally to wood chippers and, more particularly, to a side feed wheel assembly for a wood chipper.

2. Description of the Related Art

It is known to provide a wood chipper for chipping wood such as brush, branches, and the like to produce wood chips. An example of such a wood chipper is disclosed in U.S. Pat. No. 5,988,539 to Morey. In this patent, the wood chipper includes an infeed hopper, primary feed wheel assembly, and a cutting assembly having a rotatable disc or drum with at least one knife or blade for chipping the wood entering the wood chipper and reducing it to wood chips. Typically, the primary feed wheel assembly includes a stationary lower primary feed wheel connected to a lower housing and a movable upper primary feed wheel connected to an upper housing movable relative to the lower housing for allowing wood to enter the cutting assembly. The primary feed wheel assembly may include a spring interconnecting the upper housing and the lower housing to urge the upper primary feed wheel toward the lower primary feed wheel to apply a spring force against the wood entering between the primary feed wheels to feed the wood to the cutting assembly.

Although this primary feed wheel assembly has worked well, it is known that the wood material fed to the primary feed wheel assembly tends to slide to a side of the infeed hopper. This may result in plugging of the infeed to the primary feed wheel assembly. In addition, long lengths of wood material that have slid to the side are typically taken out of the infeed hopper by an operator and re-fed into the primary feed wheel assembly, which is time consuming and undesired.

Therefore, it is desirable to provide a side feed wheel assembly to align feeding of wood material to the primary feed wheel assembly. It is also desirable to provide a side feed wheel assembly to reduce operator physical involvement in feeding the wood material to the primary feed wheel assembly. It is further desirable to provide a side feed wheel assembly for a wood chipper, which reduces plugging of the infeed to the primary feed wheel assembly by wood material when fed in by an operator under normal or extreme operating conditions. Therefore, there is a need in the art to provide a side feed wheel assembly for a wood chipper to that meets these desires.

SUMMARY OF THE INVENTION

Accordingly, the present invention is a side feed wheel assembly for a wood chipper including at least one side feed wheel adapted to be disposed adjacent at least one primary feed wheel of the wood chipper. The side feed wheel assembly also includes a mechanism for moving the side feed wheel transversely relative to the at least one primary feed wheel to feed wood material to the at least one primary feed wheel of the wood chipper.

One advantage of the present invention is that a side feed wheel assembly is provided for a wood chipper. Another advantage of the present invention is that the side feed wheel assembly aligns feeding of the wood material to the primary feed wheels. Yet another advantage of the present invention is that the side feed wheel assembly has a side feed wheel positioned on a side of an infeed hopper and moveable relative to at least one primary feed wheel. Still another advantage of the present invention is that the side feed wheel assembly provides for crushing of the wood material fed to the primary feed wheels. A further advantage of the present invention is that the side feed wheel assembly assists in pulling in wood material fed to the primary feed wheels. Yet a further advantage of the present invention is that the side feed wheel assembly breaks down limb type wood material fed to the primary feed wheels. Still a further advantage of the present invention is that the side feed wheel assembly reduces operator physical involvement feeding wood material to the primary feed wheels of the wood chipper. Another advantage of the present invention is that the side feed wheel assembly reduces plugging of the infeed to the primary feed wheels by feeding wood material by an operator to the primary feed wheels.

Other features and advantages of the present invention will be readily appreciated, as the same becomes better understood, after reading the subsequent description when taken in conjunction with the accompanying drawings.

DESCRIPTION OF THE PREFERRED EMBODIMENT(S)

Referring now to the drawings and in particular FIGS. 1 through 6B, one embodiment of a side feed wheel assembly 10, according to the present invention, is shown for a wood chipper, generally indicated at 12. The wood chipper 12 includes an infeed hopper assembly 14 having an inlet 16 to allow wood material to enter the wood chipper 12. The wood chipper 12 also includes a primary feed wheel assembly 17 disposed between and adjacent to the infeed hopper assembly 14 and a cutting assembly 18 for rotation about a horizontal axis adjacent to the primary feed wheel assembly 17. The primary feed wheel assembly 17 is used for pulling and pushing the wood material from the infeed hopper assembly 14 to the cutting assembly 18. The cutting assembly 18 includes a rotatable disc or drum (not shown) having a plurality of blades (not shown) operatively connected to the disc or drum for chipping the wood material. The side feed wheel assembly 10 is used to push or feed wood material to the primary feed wheels 36 of the primary feed wheel assembly 17. It should be appreciated that, except for the side wheel feed wheel assembly 10, the wood chipper 12 is conventional and known in the art.

The wood chipper 12 includes an engine (not shown) mounted on a frame 20 and coupled to the primary feed wheel assembly 17 and cutting assembly 18 by suitable means to cause rotation of the primary feed wheels 36 to be described and the disc or drum. The wood chipper 12 includes a rotatable shaft (not shown) operatively connected to the disc or drum of the cutting assembly 18 and a pulley (not shown) disposed about one end of the shaft. The wood chipper 12 also includes a rotatable shaft (not shown) operatively connected to the engine and a pulley (not shown) disposed about the shaft (not shown). The wood chipper 12 further includes a belt or belts (not shown) disposed over and interconnecting the pulleys. It should be appreciated that the engine rotates the disc or drum of the cutting assembly 18 and a pump (not shown) pumps hydraulic fluid to rotate the primary feed wheels 36 to be described of the primary feed wheel assembly 17.

The wood chipper 12 includes an outlet or discharge chute 22 operatively connected to the cutting assembly 18. The discharge chute 22 is generally tubular and may be circular or rectangular in cross-sectional shape. The discharge chute 22 extends upwardly and away. It should be appreciated that the discharge chute 22 may have any suitable cross-sectional shape.

Referring to FIGS. 1 through 6B, the primary feed wheel assembly 17 includes a housing, generally indicated at 30. The housing 30 includes a first or lower housing 32 having a generally rectangular shape. The lower housing 32 is stationary and connected to the cutting assembly 18 by suitable means such as welding. The lower housing 32 has an inlet (not shown) on one side to receive wood material from the infeed hopper assembly 14 and an outlet (not shown) on the other side to discharge wood material to the cutting assembly 18. It should also be appreciated that the lower housing 32 may have any suitable cross-sectional shape.

The housing 30 also includes a movable second or upper housing 34 disposed over the lower housing 32 and slidable relative to the lower housing 32. The upper housing 34 is generally rectangular in shape with a generally inverted U shape cross-section to enclose or cover the lower housing 32. The upper housing 34 has an inlet (not shown) on one side to receive wood material from the infeed hopper assembly 14 and an outlet (not shown) on the other side to discharge wood material to the cutting assembly 18. It should be appreciated that the upper housing 34 may have any suitable cross-sectional shape.

The primary feed wheel assembly 17 also includes a plurality of rotatable primary feed wheels 36 disposed in the housing 30. In a preferred embodiment, the primary feed wheels 36 are two primary feed wheels 36a and 36b. Preferably, the primary feed wheels 36a and 36b are orientated horizontally to rotate about a horizontal axis. The primary feed wheel 36a is a lower primary feed wheel, which is supported by the lower housing 32. The primary feed wheel 36b is an upper primary feed wheel, which is supported by the upper housing 34. The lower primary feed wheel 32a and upper primary feed wheel 32b form a pair of the primary feed wheels 36 and the upper primary feed wheel 36b is spaced vertically from the lower primary feed wheel 36a. The lower primary feed wheel 36a is rotatably supported on the lower housing 32 by a pair of opposed bearings (not shown). The bearings are secured to the lower housing 32 by suitable means such as fasteners (not shown). It should be appreciated that the lower primary feed wheel 36a is disposed within the lower housing 32 and supported by the bearings to rotate relative to the housing 30.

The upper primary feed wheel 36b is rotatably supported on the upper housing 34 by a pair of opposed bearings (not shown). The bearings are secured to the upper housing 34 by suitable means such as fasteners (not shown). It should be appreciated that the upper primary feed wheel 36b is disposed within the upper housing 34 and supported by the bearings to rotate relative to the housing 30. It should also be appreciated that one end of the primary feed wheels 36a and 36b are operatively connected to the engine of the wood chipper 12 by suitable means such as the hydraulic pump (not shown) which pumps fluid to drive hydraulic motors 36c and 36d to rotate the primary feed wheels 36a and 36b. It should be appreciated that the wood chipper 12 may have a hydraulic yoke (not shown) connected to the hydraulic pump and the upper housing 34 to allow an operator to slidably raise and lower the upper housing 34 relative to the lower housing 32. It should also be appreciated that, in other embodiments, the primary feed wheels 36 may be located horizontally, vertically, or diagonally for the primary feed wheel assembly 17.

Referring to FIGS. 1 through 6B, the side feed wheel assembly 10 includes a side housing 55 connected to the housing 30. The side housing 55 has a generally rectangular shape. The side housing 55 is stationary and connected to the housing 30 by suitable means such as welding. The side housing 55 has an opening 56 on one side communicating with an interior of the infeed hopper assembly 14. It should also be appreciated that the side housing 55 may have any suitable cross-sectional shape.

The side feed wheel assembly 10 also includes at least one, preferably a plurality of slide bars or tracks 58 for a function to be described. The tracks 58 are generally cylindrical in shape with a generally circular cross-sectional shape. The tracks 58 extend transversely and are located at the upper and lower front and rear edges of the side housing 55. The tracks 58 are connected to the side housing 55 by suitable means such as welding. It should be appreciated that slide bars (not shown) may be used in place of the tracks 58 for sliding movement to be described.

The side feed wheel assembly 10 includes at least one, preferably a plurality of slides or rollers 60 to cooperate with the tracks 58 for sliding or rolling movement therealong. The rollers 60 are rotatably mounted to an upper plate 62 and lower plate 64 by suitable means such as brackets 66. The plates 62 and 64 are generally rectangular in shape and are disposed between the tracks 58. Preferably, a pair of rollers 60 is located at each front and rear edge of each plate 62 and 64 and spaced transversely therealong. It should be appreciated that the rollers 60 support the plates 62 and 64 on the tracks 58 and that the rollers 60 move the plates 62 and 64 relative to the tracks 58. It should also be appreciated that the rollers 60 are conventional and known in the art. It should further be appreciated that slides (not shown) could be used with slide bars (not shown).

The side feed wheel assembly 10 further includes at least one side feed wheel 68 to urge wood material toward the primary feed wheels 36. In a preferred embodiment, the side feed wheel 68 is a single feed wheel. The side feed wheel 68 is generally cylindrical in shape with a generally circular cross-sectional shape. The side feed wheel 68 may include at least one, preferably a plurality of teeth 70 extending axially and spaced circumferentially. Preferably, the side feed wheel 68 is orientated vertically to rotate about a vertical axis. The side feed wheel 68 is rotatably supported on the upper and lower plates 62 and 64 by a pair of opposed bearings (not shown). The bearings are secured to the upper plate 62 and lower plate 64 by suitable means such as fasteners (not shown). It should be appreciated that the side feed wheel 68 is disposed within the side housing 55 and supported between the plates 62 and 64 by the bearings to rotate relative to the plates 62 and 64 and the side housing 55. It should also be appreciated that the side feed wheel 68 may be orientated on an angle relative to a vertical axis. It should further be appreciated that the teeth 70 on the side feed wheel 68 are optional. It should further be appreciated that the side feed wheel 68 could be a variety of diameters and lengths. It should still further be appreciated that a plurality of side feed wheels 68 may be used.

The side feed wheel assembly 10 may include a hydraulic motor 72 connected to one end of the side feed wheel 68 to rotate the side feed wheel 68. The hydraulic motor 72 is operatively connected by suitable means to the hydraulic pump (not shown), which pumps fluid to drive the hydraulic motor 72. It should be appreciated that, in other embodiments, the hydraulic motor 72 could be replaced and the side feed wheel 68 could be electric or pneumatic powered. It should also be appreciated that the side feed wheel 68 could also freewheel in rotation. It should further be appreciated that the hydraulic motor 72 is conventional and known in the art.

The side feed wheel assembly 10 includes an actuator 74, for example a cylinder, for moving the side feed wheel 68 left and right relative to the primary feed wheels 36. The actuator 74 may be of a hydraulic type having a cylinder 76 with one end connected to housing 30 by suitable means such as a bracket and fastener and a rod 78 with one end connected to the lower plate 64 by suitable means such as a bracket and fastener. The other end of the rod 78 is connected to a piston (not shown) slidably disposed in the cylinder 76 and the cylinder 76 is connected by suitable means (not shown) to the hydraulic pump, which pumps fluid to drive the piston in the cylinder 76. It should be appreciated that, in other embodiments, the actuator 74 could be electric, spring, or pneumatic powered. It should also be appreciated that the actuator 74 slides the plates 62 and 64 and the side feed wheel 68 left and right for horizontal movement. It should further be appreciated that the actuator 74 is conventional and known in the art.

In operation of the wood chipper 12, the engine rotates the cutting assembly 18 and hydraulically rotates the primary feed wheels 36a and 36b of the primary feed wheel assembly 17. Wood is fed into the inlet 16 of the infeed hopper assembly 14 by an operator and is contacted by the primary feed wheels 36a and 36b. The wood is fed by the primary feed wheels 36a and 36b to the cutting assembly 18. As the cutting assembly 18 rotates and contacts the wood, the wood is cut or chipped into wood chips, which move through the outlet of the cutting assembly 18 and are expelled out of the discharge chute 22.

Figure 1:
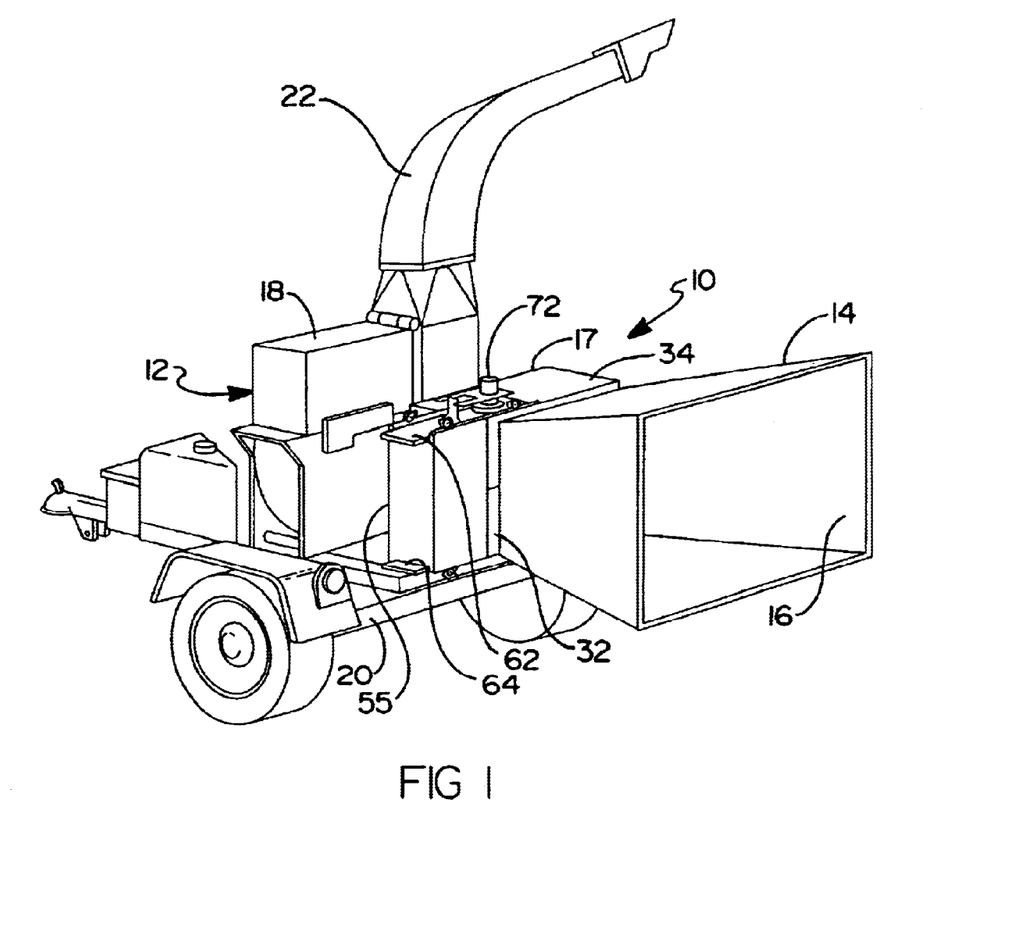
FIG. 1 is a perspective view of a side feed wheel assembly, according to the present invention, illustrated in operational relationship with a wood chipper.
Figure 2:
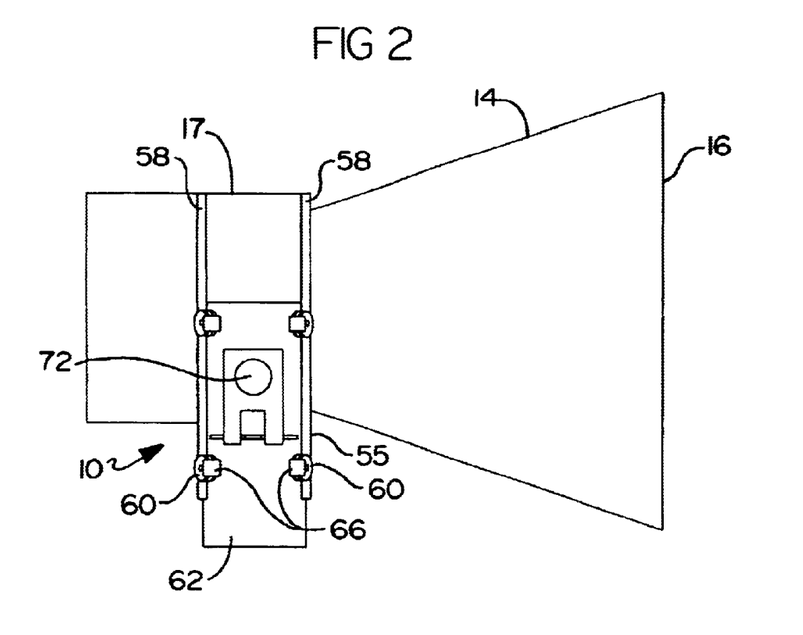
FIG. 2 is a plan view of the side feed wheel assembly of FIG. 1 illustrating a first operative position.
Figure 3:
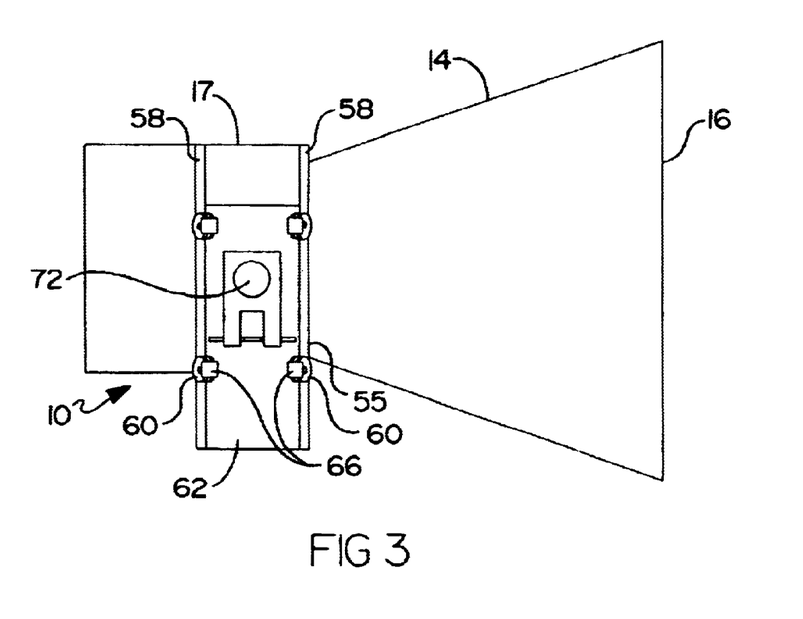
FIG. 3 is a view similar to FIG. 2 of the side feed wheel assembly illustrating in a second operative position.
Figure 4:
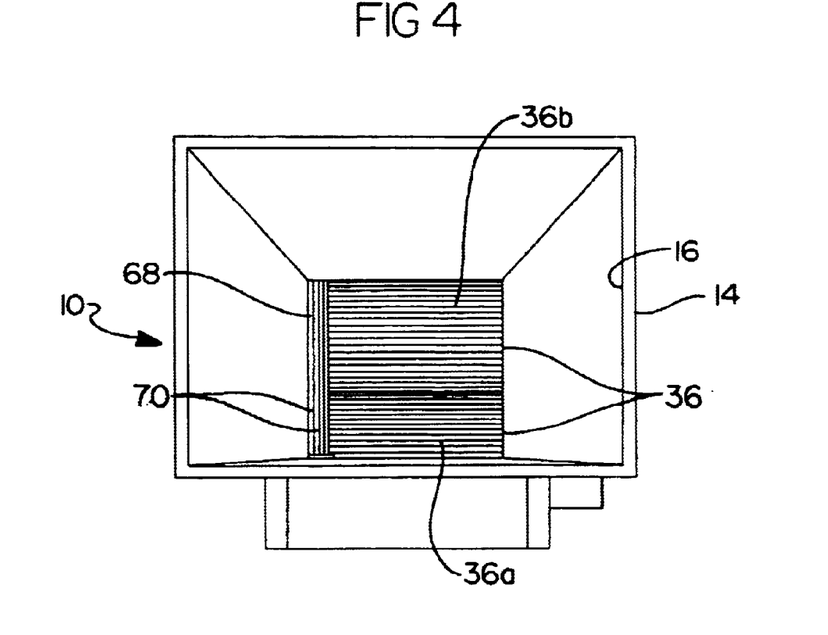
FIG. 4 is a front elevational view of the side feed wheel assembly of FIG. 1 illustrating a first operative position.
Figure 5:
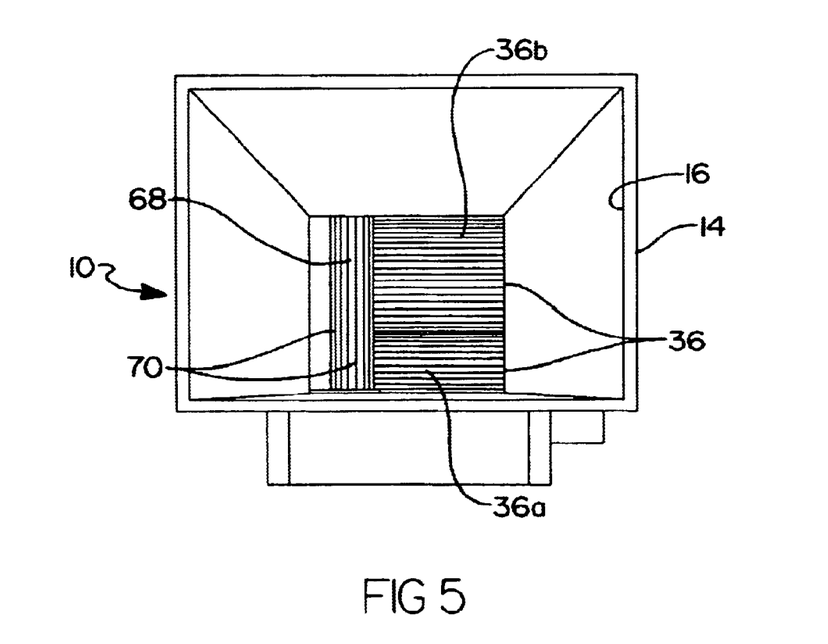
FIG. 5 is a view similar to FIG. 4 of the side wheel feed wheel assembly illustrating a second operative position.
Figure 6A:
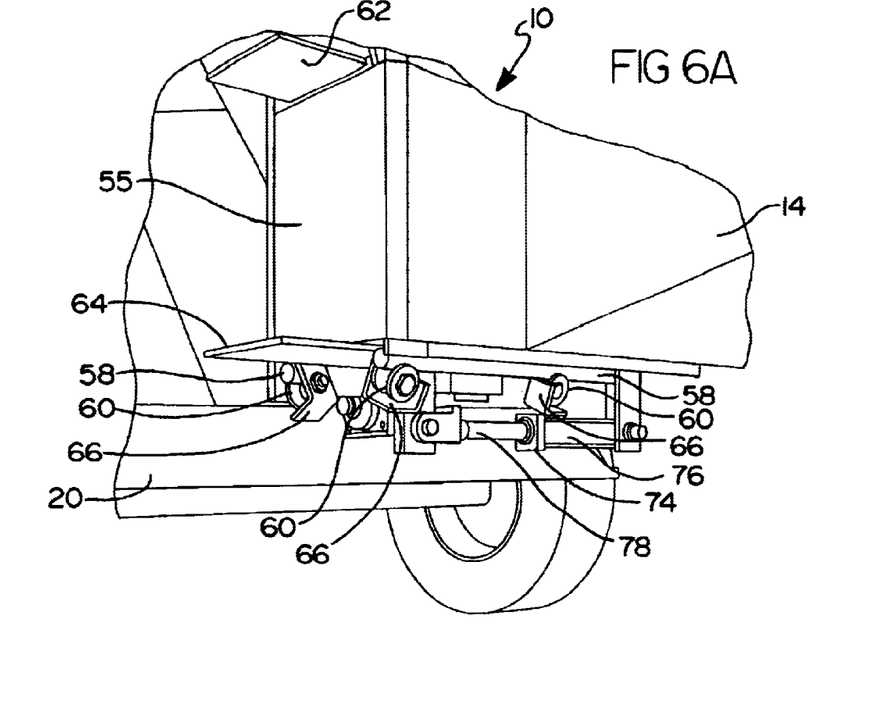
FIGS. 6A and 6B are side perspective views of the side feed wheel assembly of FIG. 1.
Figure 6B:
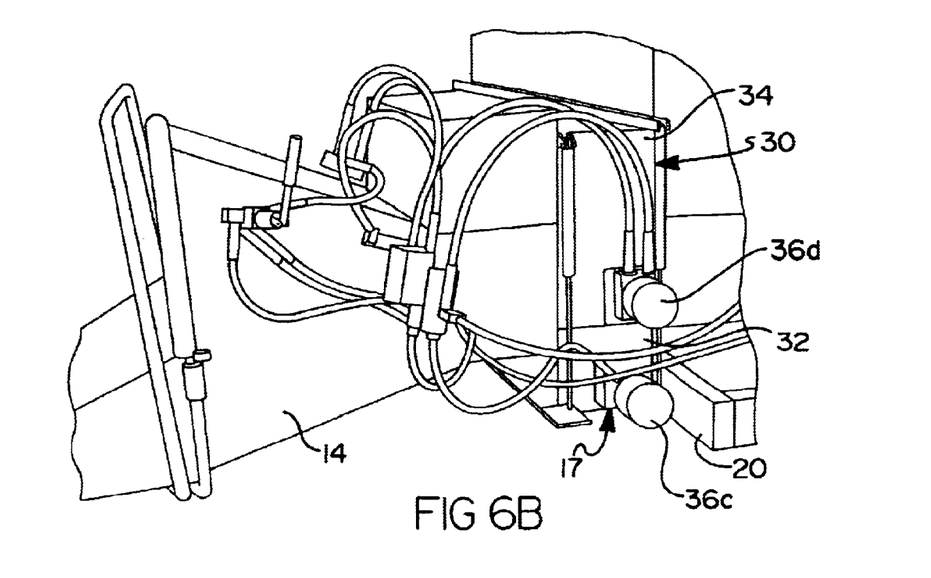
Figure 7:
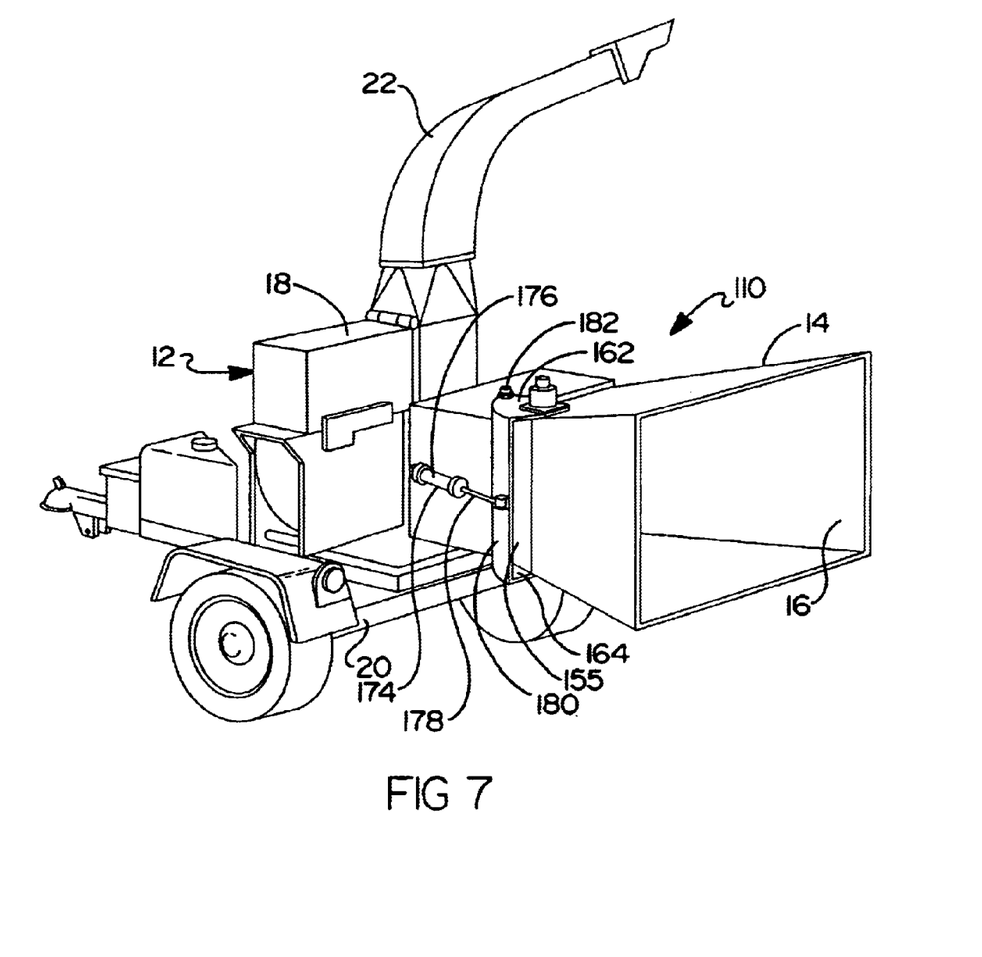
FIG. 7 is a perspective view of another embodiment, according to the present invention, of the side feed wheel assembly of FIG. 1 illustrated in operational relationship with a wood chipper.

In operation of the side feed wheel assembly 10, the engine hydraulically rotates the side feed wheel 68. As the wood fed into the inlet 16 contacts the primary feed wheels 36a and 36b, it may move to the side of the infeed hopper assembly 14 and contact the side feed wheel 68. The operator moves a lever (not shown) which can hydraulically actuate the actuator 74 to move or slide the plates 62 and 64 and side feed wheel 68 via the rollers 60 and tracks 58 toward the primary feed wheels 36 as illustrated in FIGS. 3 and 5. The movement of the side feed wheel 68, in turns, moves the wood material away from the side of the infeed hopper assembly 14 and aligns the wood material with the primary feed wheels 36. The rotation of the side feed wheel 68, in turn, moves or feeds the wood material toward the primary feed wheels 36. When the operator releases or counter-moves the lever, the actuator 74 moves or returns the plates 62 and 64 and side feed wheel 68 via the rollers 60 and tracks 58 away from the primary feed wheels 36 as illustrated in FIGS. 2 and 4. It should be appreciated that, when the side feed wheel 68 moves left and right, the side feed wheel 68 may be designed to move a variety of distances. It should also be appreciated that the side feed wheel 68 may be located anywhere between the outlet or rim of the infeed hopper assembly 14 and the cutting assembly 18. It should further be appreciated that the side feed wheel assembly 10 may be located on either or both the left side and right side of the infeed hopper assembly 14. It should still further be appreciated that the side feed wheel assembly 10 can be used to retrofit exiting wood chippers or manufactured as original equipment on wood chippers.

Referring to FIGS. 7 through 11, another embodiment, according to the present invention, of the side feed wheel assembly 10 is shown. Like parts of the side feed wheel assembly 10 has like parts increased by one hundred (100). In this embodiment, the side feed wheel assembly 110 is of a pivotal type to pivot left or right. The side feed wheel assembly 110 includes the side housing 155 connected to the housing 30. The side housing 155 is generally arcuate in shape and connected to the housing 30 by suitable means such as welding. The side feed wheel assembly 110 also includes the upper plate 162 and lower plate 164 and a side plate 180 interconnecting the plates 162 and 164. The upper plate 162 and lower plate 164 are generally arcuate in shape and the side plate 180 has a generally arcuate cross-sectional shape. The side plate is connected to the upper plate 162 and lower plate 164 by suitable means such as welding. The upper plate 162 and lower plate 164 are pivotally connected to the housing 30 by suitable means such as bearings 182. It should be appreciated that the upper plate 162, lower plate 164, and side plate 180 pivot about a vertical axis defined by the bearings 182.

The side feed wheel assembly 110 includes the side feed wheel 168 disposed in the side housing 130 and connected to the upper plate 162 and lower plate 164. The side feed wheel 168 may include the teeth 170. The side feed wheel assembly 110 also includes upper and lower slots 184 extending inwardly into the infeed hopper assembly 14 to allow the side feed wheel 168 to move a predetermined distance toward the primary feed wheels 36. The slots 184 are generally arcuate in shape. The side feed wheel assembly 110 further includes the hydraulic motor 172 connected to the side feed wheel 168.

The side feed wheel assembly 110 includes an actuator 174, for example a cylinder, for moving the side feed wheel 168 left and right relative to the primary feed wheels 36. The actuator 174 may be of a hydraulic type having a cylinder 176 with one end connected to housing 30 by suitable means such as a bracket and fastener and a rod 178 with one end connected to the side plate 180 by suitable means such as a bracket and fastener. The other end of the rod 178 is connected to a piston (not shown) slidably disposed in the cylinder 176 and the cylinder 176 is connected by suitable means to the hydraulic pump, which pumps fluid to drive the piston in the cylinder 176.

Figure 8:
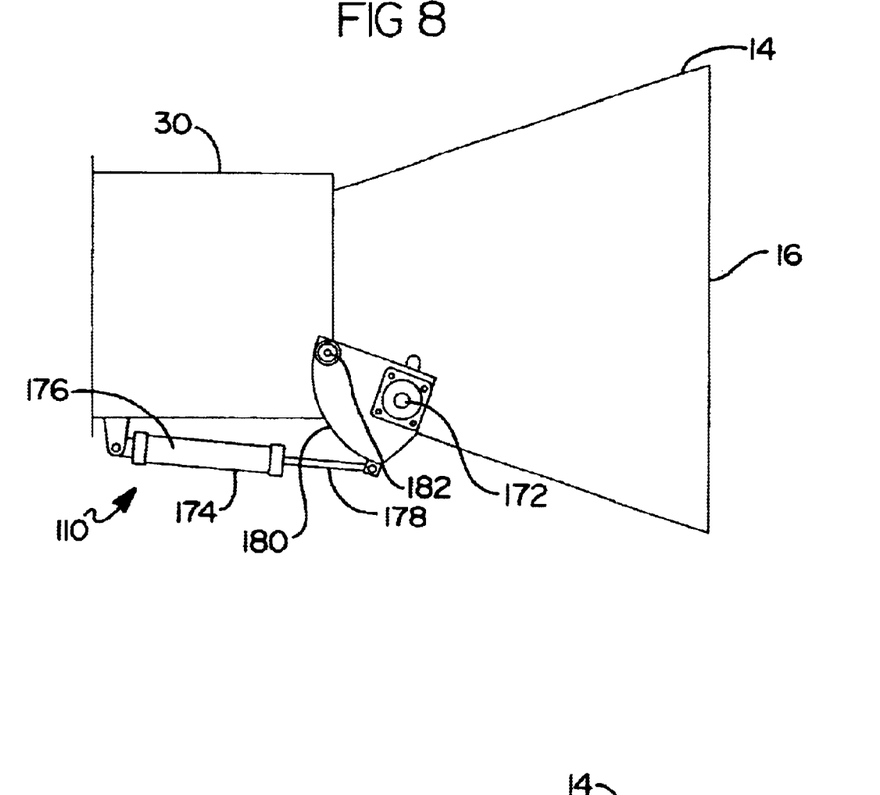
FIG. 8 is a plan view of the side feed wheel assembly of FIG. 7 illustrating a first operative position.
Figure 9:
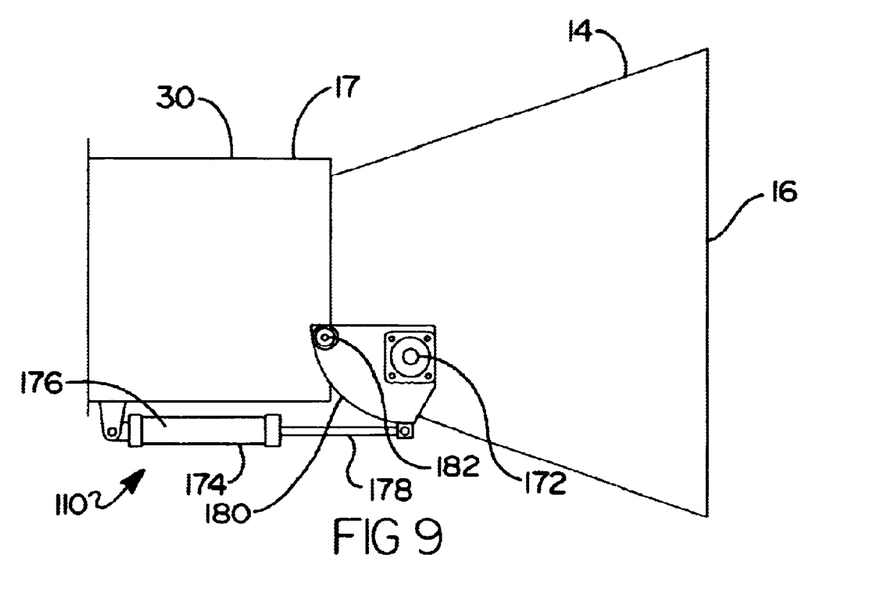
FIG. 9 is a view similar to FIG. 8 of the side feed wheel assembly illustrating in a second operative position.
Figure 10:
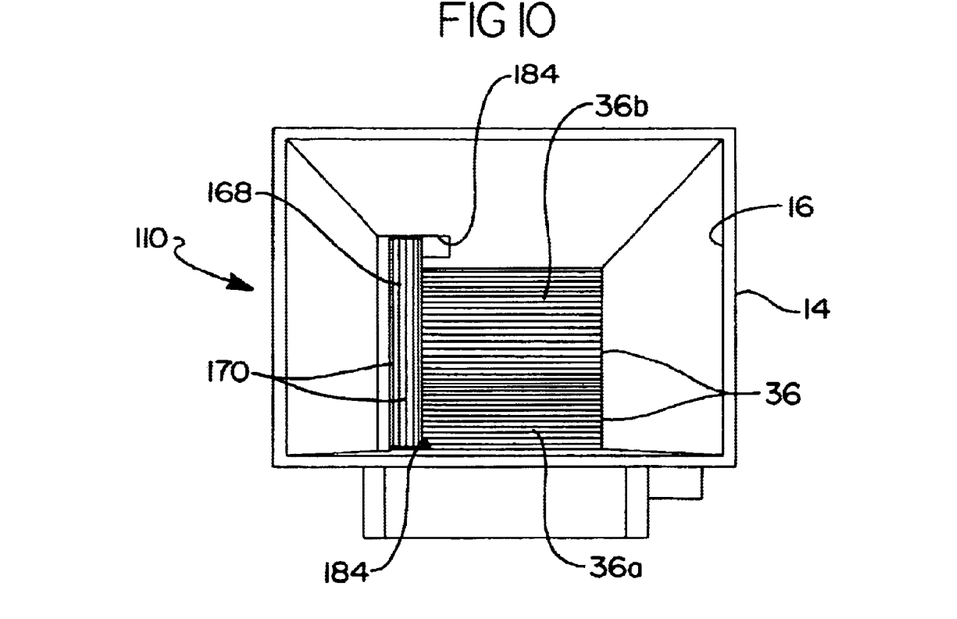
FIG. 10 is a front elevational view of the side feed wheel assembly of FIG. 7 illustrating a first operative position.
Figure 11:
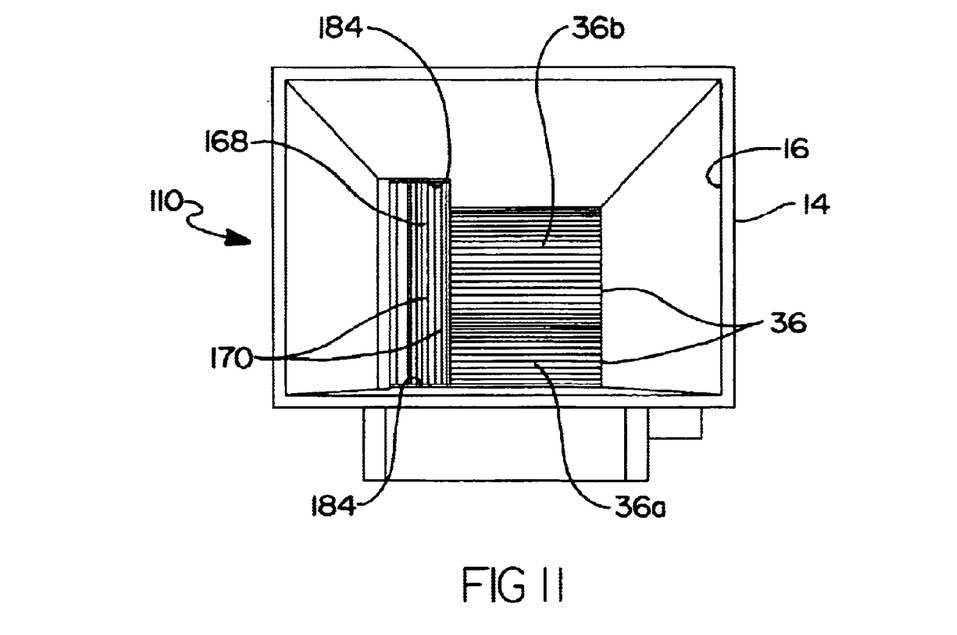
FIG. 11 is a view similar to FIG. 10 of the side wheel feed wheel assembly illustrating a second operative position.

In operation of the side feed wheel assembly 110, the engine hydraulically rotates the side feed wheel 168. As the wood fed into the inlet 16 contacts the primary feed wheels 36a and 36b, it may move to the side of the infeed hopper assembly 14 and contact the side feed wheel 168. The operator moves a lever (not shown) which hydraulically actuates the actuator 174 to move or pivot the plates 162 and 164 and side feed wheel 168 via the bearings 182 toward the primary feed wheels 36 as illustrated in FIGS. 9 and 11. The movement of the side feed wheel 168, in turns, moves the wood material away from the side of the infeed hopper assembly 14 and aligns the wood material with the primary feed wheels 36. The rotation of the side feed wheel 168, in turn, moves or feeds the wood material toward the primary feed wheels 36. When the operator releases or counter-moves the lever, the actuator 174 moves or returns the plates 162 and 164 and side feed wheel 168 via the bearings 182 away from the primary feed wheels 36 as illustrated in FIGS. 8 and 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A side feed wheel assembly comprising:
   at least one primary feed wheel for feeding wood material to a cutting mechanism of a wood chipper;
   at least one side feed wheel adapted to be located on a side of the wood chipper; and
   a mechanism for moving said at least one side feed wheel transversely relative to said at least one primary feed wheel to feed wood material to said at least one primary feed wheel.

2. A side feed wheel assembly as set forth in claim 1 wherein said mechanism comprises an actuator operatively connected to said at least one side feed wheel and the wood chipper for moving said at least one side feed wheel transversely.

3. A side feed wheel assembly as set forth in claim 2 wherein said mechanism further comprises an upper plate and a lower plate, said at least one side feed wheel being rotatably connected to said upper plate and said lower plate.

4. A side feed wheel assembly as set forth in claim 3 wherein said actuator has one end connected to one of said upper plate and said lower plate to slide said rollers along said track.

5. A side feed wheel assembly as set forth in claim 3 including a side plate interconnecting said upper plate and said lower plate.

6. A side feed wheel assembly as set forth in claim 5 wherein said actuator has one end connected to said side plate to pivot said side plate.

7. A side feed wheel assembly as set forth in claim 3 including a side housing adapted to be connected to the wood chipper to enclose said at least one side feed wheel.

8. A side feed wheel assembly as set forth in claim 1 wherein said at least one side feed wheel includes a plurality of teeth.

9. A side feed wheel assembly as set forth in claim 1 including a motor for rotating said at least one side feed wheel.

10. A side feed wheel assembly as set forth in claim 1 wherein said at least one side feed wheel is orientated vertically.

11. A side feed wheel assembly as set forth in claim 1 wherein said at least one side feed wheel is orientated an angle relative to a vertical axis.

12. A wood chipper comprising:
    at least one primary feed wheel;
    at least one side feed wheel;
    a mechanism for moving said at least one side feed wheel transversely relative to said at least one primary feed wheel to feed wood material to said at least one primary feed wheel, said mechanism comprising an upper plate and a lower plate, said at least one side feed wheel being rotatably connected to said upper plate and said lower plate;
    a side housing to enclose said at least one side feed wheel; and
    a plurality of tracks connected to said side housing and a plurality of rollers connected to said upper plate and said lower plate, said rollers cooperating with said tracks for movement therealong.

13. A feed wheel assembly for a wood chipper comprising:
    an infeed hopper;
    a rotatable cutting assembly spaced from said infeed hopper;
    a plurality of primary feed wheels disposed between said infeed hopper and said cutting assembly;
    a side feed wheel disposed adjacent said primary feed wheels; and
    a mechanism for moving said side feed wheel transversely relative to said primary feed wheels to feed wood material to said primary feed wheels.

14. A feed wheel assembly as set forth in claim 13 wherein said mechanism comprises an actuator operatively connected to said side feed wheel and the wood chipper for moving said side feed wheel transversely.

15. A feed wheel assembly as set forth in claim 14 wherein said mechanism further comprises an upper plate and a lower plate, said side feed wheel being rotatably connected to said upper plate and said lower plate.

16. A feed wheel assembly as set forth in claim 15 including a side housing connected to said infeed chute to enclose said side feed wheel.

17. A feed wheel assembly as set forth in claim 16 including a plurality of tracks connected to said side housing and a plurality of rollers connected to said upper plate and said lower plate, said rollers cooperating with said tracks for movement therealong.

18. A feed wheel assembly as set forth in claim 15 including a side plate interconnecting said upper plate and said lower plate.

19. A feed wheel assembly as set forth in claim 18 wherein said actuator has one end connected to said side plate to pivot said side plate.

20. A wood chipper comprising:
    an infeed hopper;
    a rotatable cutting assembly spaced from said infeed hopper;
    a first horizontal primary feed wheel and a second horizontal primary feed wheel disposed between said infeed hopper and said cutting assembly;

a side feed wheel disposed adjacent said first horizontal primary feed wheel and said second horizontal primary feed wheel; and a mechanism for sliding said side feed wheel transversely relative to said first horizontal primary feed wheel and said second horizontal primary feed wheel to feed wood material to said first horizontal primary feed wheel and said second horizontal primary feed wheel.

21. A multiple wheel feed wheel assembly for a wood chipper comprising:

an infeed hopper;

a rotatable cutting assembly spaced from said infeed hopper;

a first horizontal primary feed wheel and a second horizontal primary feed wheel disposed between said infeed hopper and said cutting assembly;

a side feed wheel disposed adjacent said first horizontal primary feed wheel and said second horizontal primary feed wheel; and a mechanism for pivoting said side feed wheel transversely relative to said first horizontal primary wheel and said second horizontal primary feed wheel to feed wood material to said first horizontal primary feed wheel and said second horizontal primary feed wheel.

* * * * *